United States Patent
Jaradi et al.

(10) Patent No.: US 11,370,389 B2
(45) Date of Patent: Jun. 28, 2022

(54) PASSENGER RESTRAINT PRETENSIONER

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 346 days.

(21) Appl. No.: 16/664,988

(22) Filed: Oct. 28, 2019

(65) Prior Publication Data

US 2021/0122327 A1   Apr. 29, 2021

(51) Int. Cl.
*B60R 22/46*    (2006.01)
*B60R 22/195*   (2006.01)

(52) U.S. Cl.
CPC ...... *B60R 22/4628* (2013.01); *B60R 22/1951* (2013.01); *B60R 2022/468* (2013.01); *B60R 2022/4661* (2013.01)

(58) Field of Classification Search
CPC . B60R 22/46; B60R 22/1951; B60R 22/1952; B60R 22/1954; B60R 22/4628; B60R 2022/468; B60R 2022/4661
See application file for complete search history.

(56) References Cited

U.S. PATENT DOCUMENTS

| | | | |
|---|---|---|---|
| 5,145,209 A | | 9/1992 | Lenzen |
| 5,211,423 A | * | 5/1993 | Krambeck .......... B60R 22/1953 |
| | | | 280/806 |
| 5,299,830 A | | 4/1994 | Hanna et al. |
| 5,364,129 A | * | 11/1994 | Collins ............... B60R 22/1952 |
| | | | 180/268 |
| 5,409,176 A | | 4/1995 | Kopetzky |
| 5,485,970 A | | 1/1996 | Steffens, Jr. |
| 5,681,004 A | | 10/1997 | Specht |
| 6,019,305 A | | 2/2000 | Palliser |
| 6,076,757 A | | 6/2000 | Holzapfel |
| 6,149,242 A | | 11/2000 | Pesta et al. |
| 2003/0047931 A1 | * | 3/2003 | Rees ................... B60R 22/1952 |
| | | | 280/806 |
| 2010/0270414 A1 | * | 10/2010 | Harada .................. B60R 22/46 |
| | | | 242/390.2 |

FOREIGN PATENT DOCUMENTS

EP  0635407 B1  9/1997

* cited by examiner

*Primary Examiner* — Sang K Kim
(74) *Attorney, Agent, or Firm* — Frank A. MacKenzie; Bejin Bieneman PLC

(57) ABSTRACT

An assembly includes a housing. The assembly includes a spool rotatable relative to the housing. The assembly includes a cable fixed to the spool. The assembly includes a passenger restraint fixed to the cable. The assembly includes a pyrotechnic device fixed relative to the housing and designed to rotate the spool relative to the housing. The assembly includes a ratchet-and-pawl mechanism between the housing and the spool.

19 Claims, 6 Drawing Sheets

PASSENGER RESTRAINT PRETENSIONER

BACKGROUND

Vehicles include pretensioners for positioning passenger restraints in response to a sensed vehicle impact. As one example, vehicles include seatbelts for each of the seats onboard. The seatbelt includes webbing that, when the seatbelt is buckled, extends across an occupant of the seat. An anchor attaches one end of the webbing to a seat frame. The other end of the webbing feeds into a retractor, which includes a spool that pays out and retracts the webbing. A tongue slides freely along the webbing and, when engaged with a buckle, divides the webbing into a lap band and a shoulder band. The pretensioner may pull the buckle to tension the webbing in response to a sensed vehicle impact.

DETAILED DESCRIPTION

Figure 1:
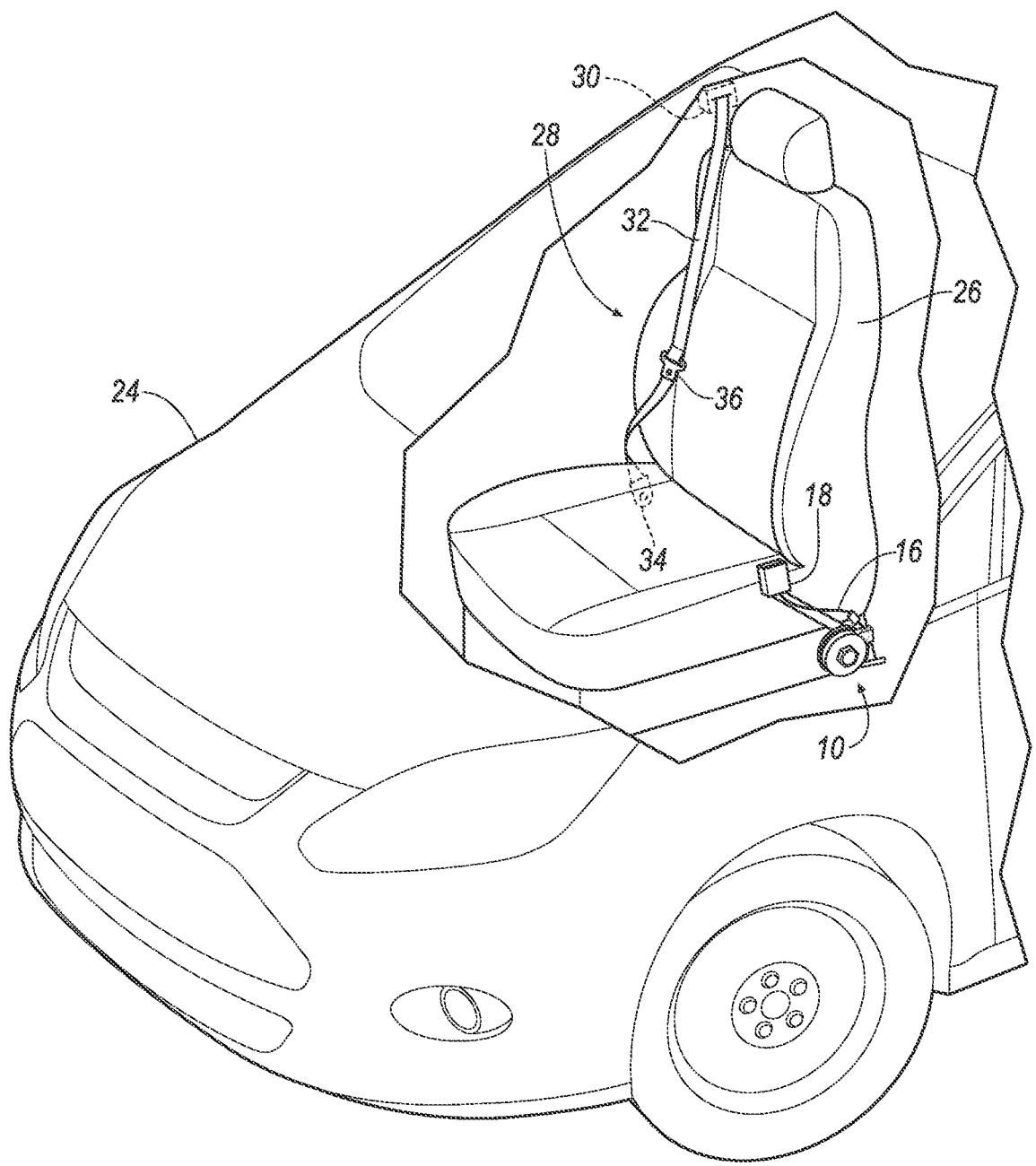
FIG. 1 is a perspective view of a vehicle having an assembly.

An assembly includes a housing, a spool rotatable relative to the housing, a cable fixed to the spool, a passenger restraint fixed to the cable, a pyrotechnic device fixed to the housing and designed to rotate the spool relative to the housing, and a ratchet-and-pawl mechanism between the housing and the spool.

The housing and the spool may define a cavity therebetween and the pyrotechnic device may have an output nozzle in communication with the cavity. The housing may include a cylindrical wall having an end and the spool is adjacent the end of the cylindrical wall of the housing. The cylindrical wall and the spool may define the cavity. The spool may be concentric with the cylindrical wall of the housing. The cylindrical wall of the housing may have an axis and the housing and the spool oppose each other along the axis. The spool may be concentric about the axis. A seal may be between the spool and the end of the cylindrical wall of the housing. A ratchet of the ratchet-and-pawl mechanism may be fixed to the cylindrical wall of the housing. The ratchet may extend into the cavity. A pawl of the ratchet-and-pawl mechanism may be fixed to the spool.

The spool may include an inner cylinder in the cavity and concentric with the cylindrical wall of the housing. The pawl being fixed to the inner cylinder of the spool. A blade may be fixed to the inner cylinder and extending from the inner cylinder toward the cylindrical wall of the housing. For example, blades may be fixed to the inner cylinder and spaced circumferentially about the inner cylinder. The blades may extend from the inner cylinder toward the cylindrical wall of the housing. A first cable stop may be fixed to the cable and a second cable stop may be fixed to the housing. The second cable stop may have a hole through which the cable slidably extends from the first cable stop to the spool. The hole is smaller than the first cable stop.

The cylindrical wall of the spool may include an outer surface having a channel and the cable is engaged with the channel.

A first cable stop may be fixed to the cable and a second cable stop may be fixed to the housing. The second cable stop may have a hole through which the cable slidably extends from the first cable stop to the spool. The hole is smaller than the first cable stop.

The passenger restraint may be a seatbelt buckle.

With reference to the Figures, wherein like numerals indicate like parts throughout the several views, an assembly 10 (e.g., a seatbelt buckle pretensioner assembly 10) for a vehicle 24 is generally shown. The assembly 10 includes a housing 12 and a spool 14 rotatable relative to the housing 12. The assembly 10 includes cable 16 fixed to the spool 14 and a passenger restraint fixed to the cable 16. The assembly 10 includes a pyrotechnic device 20 fixed to the housing 12 and designed to rotate the spool 14 relative to the housing 12. The assembly 10 includes a ratchet-and-pawl mechanism 22 between the housing 12 and the spool 14.

The pyrotechnic device 20 rotates the spool 14 to wind the cable 16 about the spool 14 and retract the passenger restraint. The ratchet-and-pawl mechanism 22 prevents extension of the cable 16 after retraction to maintain the retraction of the passenger restraint. The pyrotechnic device 20 is designed to rotate the spool 14 relative to the housing 12 and the ratchet-and-pawl mechanism 22 is designed to maintain retraction and provides packaging advantages due to an overall reduction in the length of the assembly 10.

In the example shown in the Figures, the passenger restraint is a seatbelt buckle 18. In such an example, the assembly 10 is a seatbelt buckle pretensioner assembly 10 that retracts the seatbelt buckle 18 in response to a sensed vehicle 24 impact. As another example, the passenger restraint may be an airbag. In such an example, the pyrotechnic device 20 may be activated to retract the cable 16 to position the airbag during or after inflation of the airbag.

With reference to FIG. 1, the vehicle 24 includes a passenger cabin to house occupants, if any, of the vehicle 24. The vehicle 24 includes one or more seats 26 in the passenger cabin. The seats 26 may be arranged in the passenger cabin in any suitable position, i.e., as front seats (such as that shown in FIG. 1), rear seats, third-row seats, etc. The seat 26 shown for example in FIG. 1 as a bucket seat and may be of any suitable type. Any one or more of the seats 26 of the vehicle 24 may include the assembly 10, e.g., the seatbelt buckle pretensioner assembly 10.

With reference to FIG. 1, the vehicle 24 includes a seatbelt assembly 28. As set forth above, the seatbelt assembly 28 may include the assembly 10, e.g., the seatbelt buckle pretensioner assembly 10. The seatbelt assembly 28 may include a seatbelt retractor 30 and webbing 32 retractably payable from the seatbelt retractor 30. The seatbelt assembly 28 may include an anchor 34 coupled to the webbing 32, and a clip 36 that engages the buckle 18. The seatbelt assembly 28 may be disposed adjacent the seat 26. For example, the seatbelt assembly 28 is adjacent the front seat 26, as shown in FIG. 1. Specifically, the assembly 10 may be mounted to the seat 26, e.g., a frame of a seat bottom of the seat 26, in FIG. 1. As another example, the assembly 10 may be mounted to the body of the vehicle 24. The seatbelt assembly 28, when fastened, retains the occupant on the seat, e.g., during sudden decelerations of the vehicle 24.

The webbing 32 may extend continuously from the seatbelt retractor 30 to the anchor 34. For example, one end of the webbing 32 feeds into the seatbelt retractor 30, and the other end of the webbing 32 is fixed to the anchor 34. The anchor 34 may, for example, be fixed to a body of the vehicle 24 body, e.g., the B-pillar, the floor, etc. The anchor 34 may be attached to the seat 26 in any suitable manner, e.g., with fasteners.

The webbing 32 may be fabric, e.g., woven nylon. The clip 36 slides freely along the webbing 32 and, when engaged with the buckle 18, divides the webbing 32 into a lap band and a shoulder band in the example shown in FIG. 1, i.e., a three-point configuration. The seatbelt assembly 28 may, alternatively, include another arrangement of attachment points.

The seatbelt retractor 30 may be mounted to the vehicle 24 body, e.g., the B-pillar, as shown in FIG. 1. As another example, the seatbelt retractor 30 may be mounted to the seat 26.

The seatbelt retractor 30 may be moveable from an unlocked position to a locked position by conventional mechanisms known in the art. In the unlocked position, the webbing 32 may be extended from and retracted into the seatbelt retractor 30. In the locked position, the seatbelt retractor 30 prevents extension of the webbing 32 to limit the forward movement of the occupant. The seatbelt retractor 30 may change from the unlocked position to the locked position during a sudden deceleration of the vehicle 24, i.e., deceleration triggers components of the seatbelt retractor 30 to change from the unlocked position to the locked position.

Figure 2:
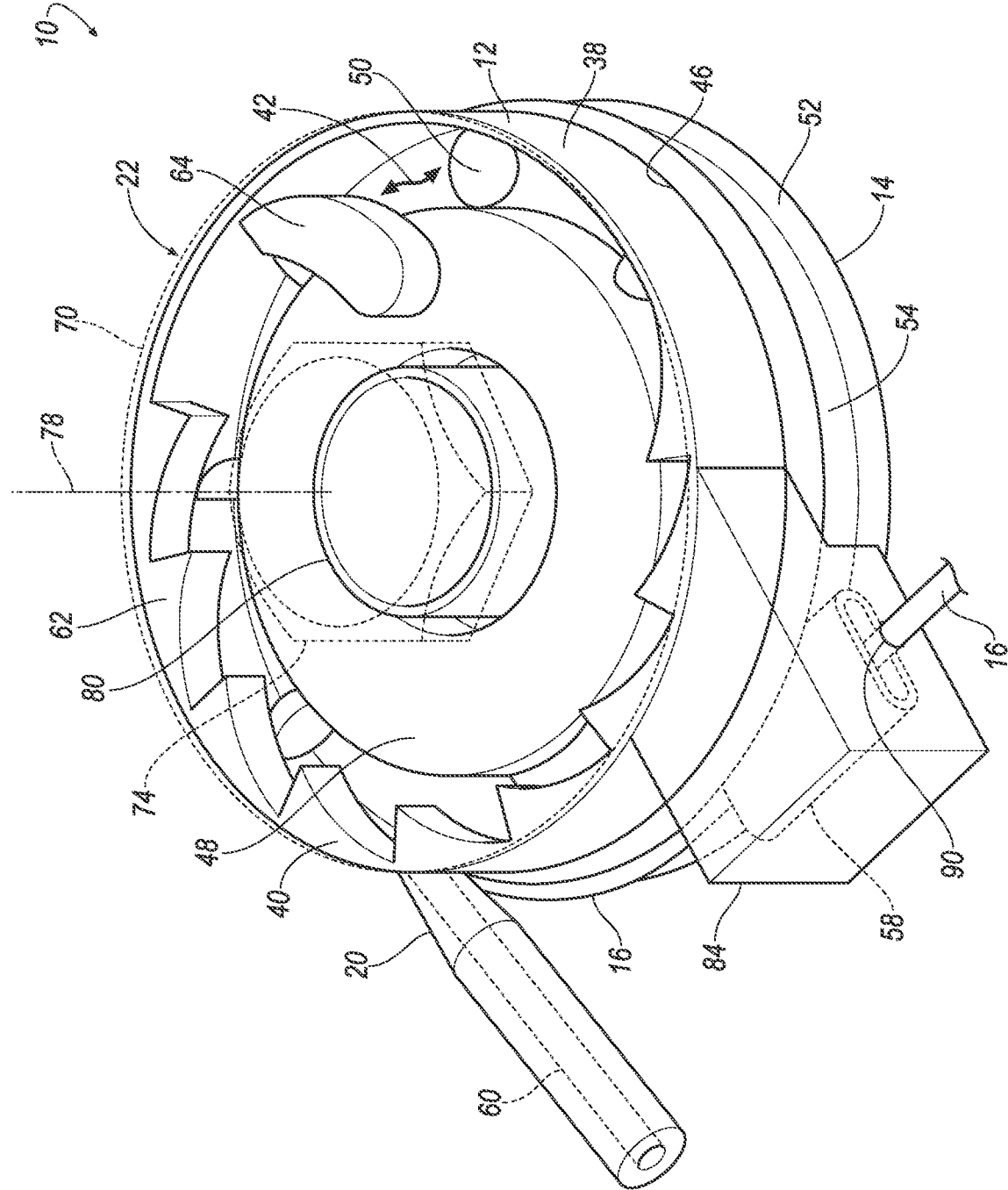
FIG. 2 is a perspective view of the assembly.
Figure 3:
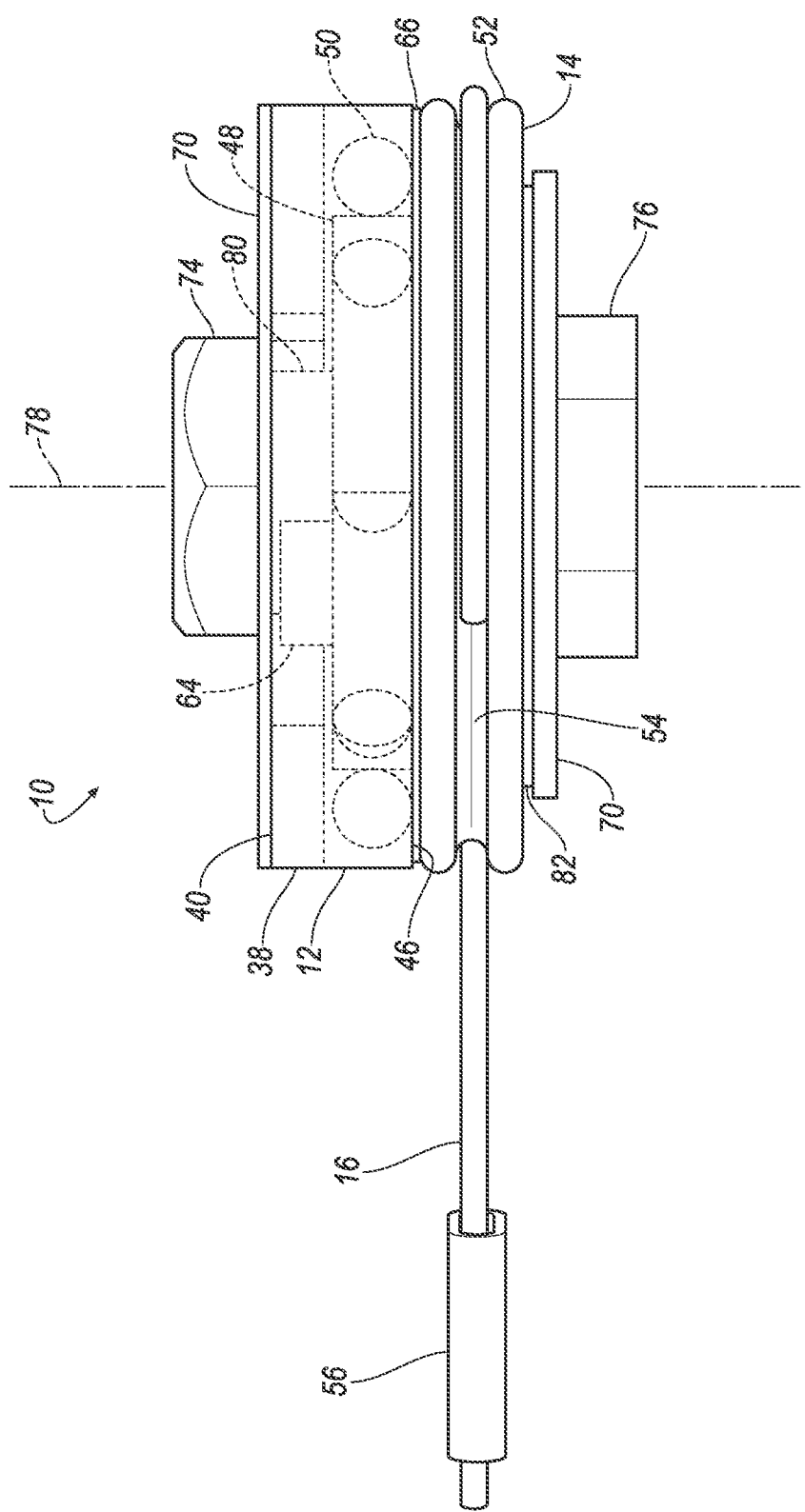
FIG. 3 is a side view of the assembly.

As set forth above, the assembly 10 is mounted to a component of the vehicle 24 such as the seat 26 or the body of the vehicle 24. In the example shown in FIG. 1, the assembly 10 is mounted to the seat 26. With reference to FIG. 2, the assembly 10 may include a bracket 84 fixed to the housing 12. The bracket 84 is fixed to a component of the vehicle 24, e.g., with fasteners, welding, etc. As an example, the bracket 84 may be fixed to the frame of the seat bottom, to the floor of the vehicle, etc.

With continued reference to FIG. 1, the housing 12 is fixed relative to the frame of the seat bottom, e.g., via the bracket 84, and the spool 14 is rotatable relative to the housing 12 about an axis 78. Specifically, the pyrotechnic device 20 activates to rotate the spool 14 relative to the housing 12, as described further below.

The housing 12 may include a cylindrical wall 38 having a first end 40 and a second end 46. The cylindrical wall 38 is centered on the axis 78. The cylindrical wall 38 defines at least a portion of a cavity 42 that is in communication with the pyrotechnic device 20 to drive rotation of the spool 14 relative to the housing 12, as described further below.

Figure 4:
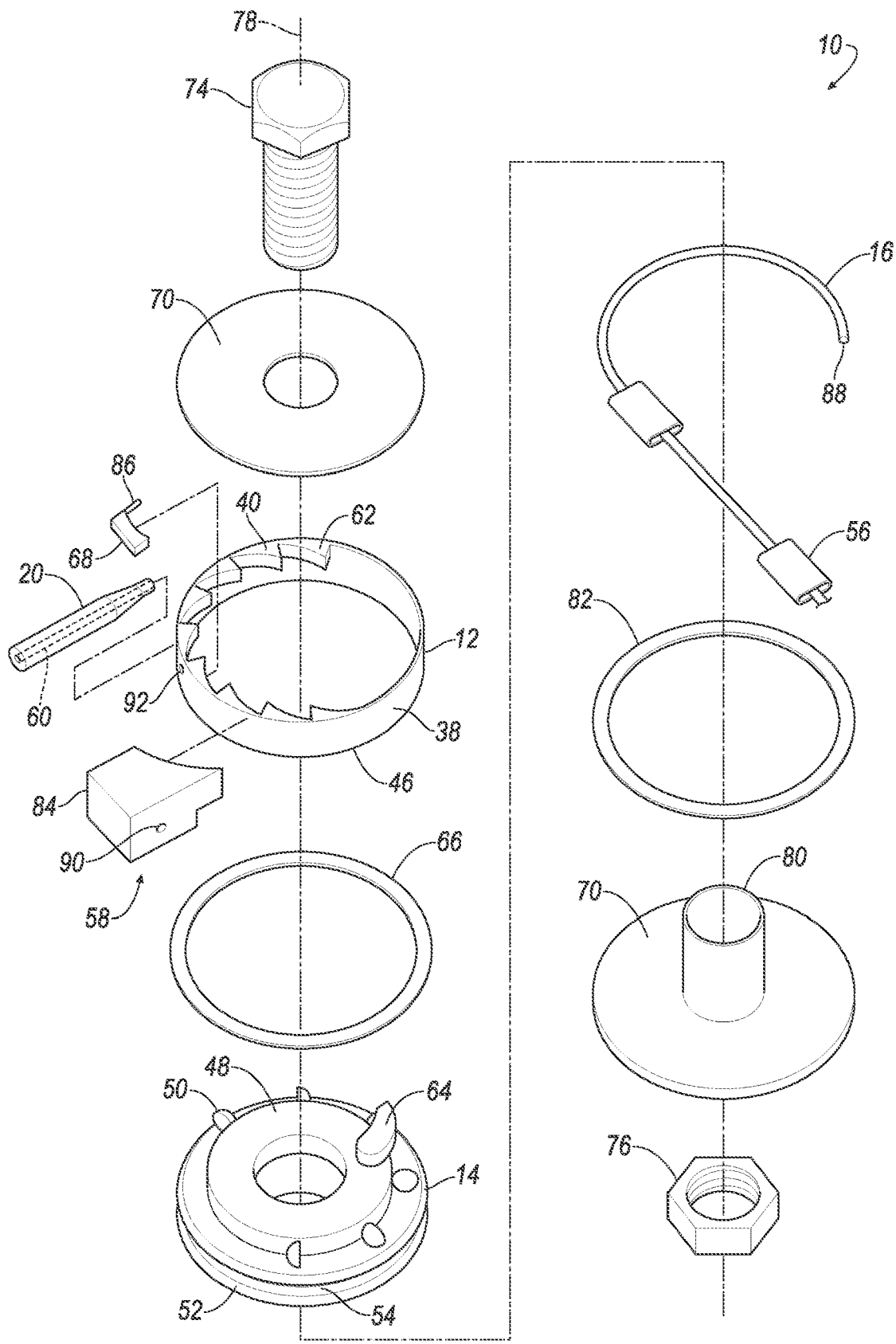
FIG. 4 is an exploded view of the assembly.

With reference to FIG. 4, the housing 12 may be hollow from the first end 40 to the second end 46. A portion of the ratchet-and-pawl mechanism 22 may extend from the cylindrical wall 38 into the cavity 42. As an example, a portion of the ratchet-and-pawl mechanism 22, e.g., a ratchet 62, may be on one end of the cylindrical wall 38, e.g., the first end 40 in the example in the Figures. The housing 12 may be adjacent the spool 14 at one end of the cylindrical wall 38, e.g., the second end 46 in the Figures. In other words, in the example shown in the Figures, the second end 46 is between the spool 14 and the first end 40. In such examples, the second end 46 may be separated from the spool 14 by a seal 66 (described further below) and/or may abut the spool 14.

The spool 14 includes a head 52. The spool 14 may include an inner cylinder 48 extending from the head 52 along the axis 78. The spool 14 is adjacent the second end 46 of the cylindrical wall 38 of the housing 12. Specifically, the head 52 of the spool 14 is adjacent the second end 46 of the cylindrical wall 38 of the housing 12. At least one seal 66 may be between the spool 14 and the second end 46 of the cylindrical wall 38 of the housing 12. The head 52 of the spool 14 may abut (i.e., with direct contact) the second end 46 of the cylindrical wall 38 of the housing 12. The spool 14, e.g., the head 52 and/or inner cylinder 48 of the spool 14, may be coaxial with the cylindrical wall 38 of the housing 12, i.e., each centered on the axis 78.

The housing 12 and the spool 14 oppose each other along the axis 78. In other words, at least a portion of the housing 12 extends beyond any portion of the spool 14 in one direction along the axis 78 and at least a portion of the spool 14 extends beyond any portion of the housing 12 in the other direction along the axis 78. At least a portion of the housing 12 and at least a portion of the spool 14 oppose each other along the axis 78 to define the cavity 42 therebetween. For example, the cylindrical wall 38 of the housing 12 and the head 52 of the spool 14 oppose each other along the axis 78 and define the cavity 42 therebetween.

Figure 5:
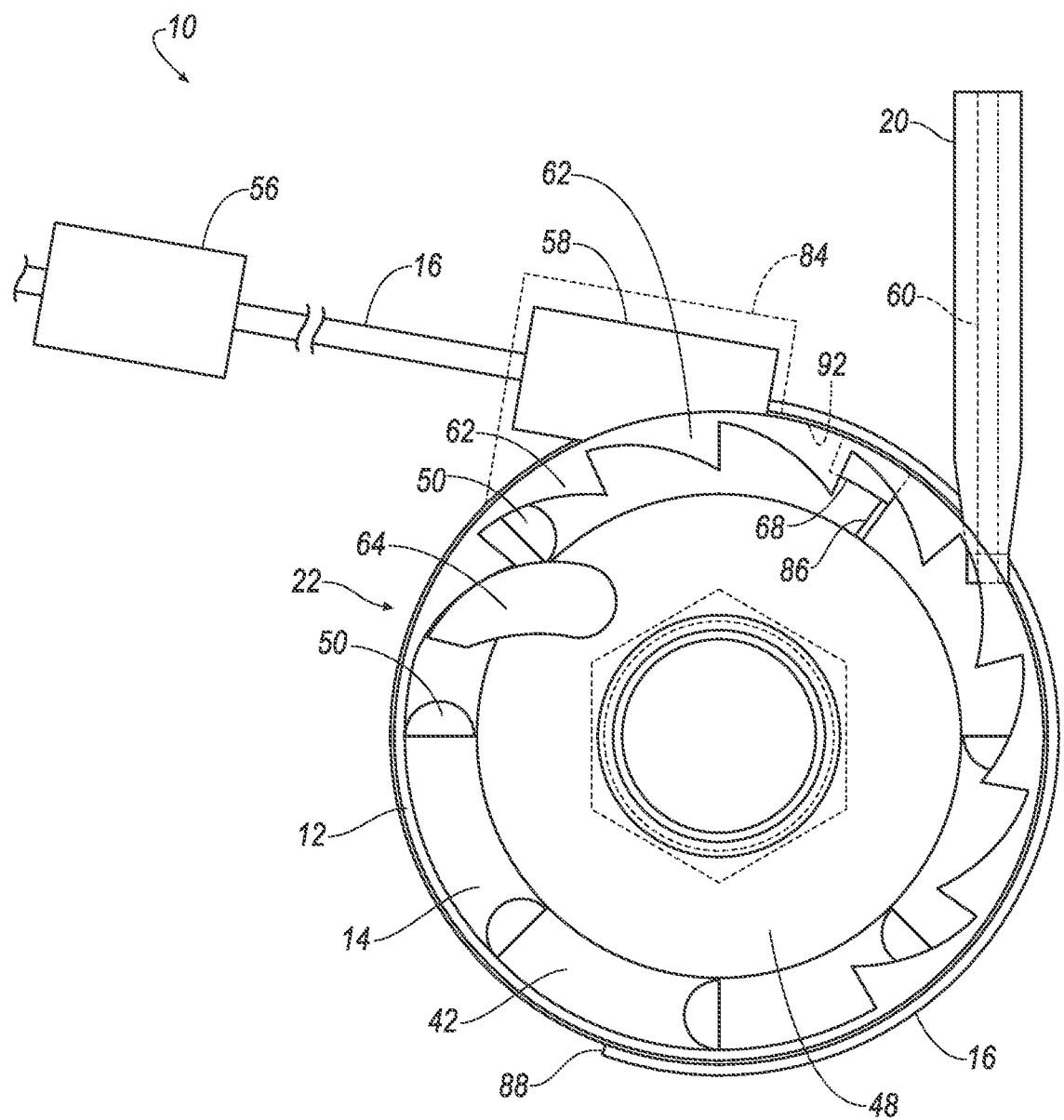
FIG. 5 is a top view of the assembly in an extended position.

The head 52 of the spool 14 may include an outer surface having a channel 54. As described further below, the cable 16 is fixed to the head 52 of the spool 14 such that the cable 16 wraps around the head 52 in the channel 54 as the head 52 rotates relative to the housing 12 about the axis 78. A portion of the cable 16 may be in the channel 54 prior to activation of the pyrotechnic device 20, as shown in FIG. 5. The channel 54 may extend continuously around the head 52 of the spool 14, i.e., the channel 54 may be endless.

The cavity 42 in the example shown in the Figures is defined by the head 52 and inner cylinder 48 and the cylindrical wall 38 of the housing 12.

The inner cylinder 48 of the spool 14 is fixed relative to the head 52 of the spool 14, i.e., the inner cylinder 48 of the spool 14 and the head 52 of the spool 14 move together as a unit. The inner cylinder 48 is coaxial with the head 52 of the spool 14, i.e., is centered on the axis 78. The inner cylinder 48 includes a bore on the axis 78. The bore receives a fastener, as described further below.

The spool 14 may include one or more blades 50 in the cavity 42 for being acted upon by gas from the pyrotechnic device 20 to rotate the spool 14 relative to the housing 12 about the axis 78. As an example, the blade(s) 50 may be fixed to the inner cylinder 48 (i.e., the blade(s) 50 and the inner cylinder 48 move together as a unit). In such an example, the blades 50 extend from the inner cylinder 48 toward the cylindrical wall 38 of the housing 12. The blade 50 is designed to be any suitable design (i.e., size, shape, material type) and to be acted upon by the gas from the pyrotechnic device 20 to rotate the rest of the spool 14 relative. In examples including more than one blade 50, the blades 50 are fixed to the inner cylinder 48 and spaced circumferentially about the inner cylinder 48.

The assembly 10 may include the cable 16 fixed to the spool 14, i.e., directly or indirectly fixed to the spool 14. Specifically, a terminal end 88 of the cable 16 is fixed to the spool 14. When the spool 14 rotates relative to the housing 12, the terminal end 88 of the cable 16 connected to the spool 14 rotates with the spool 14. The terminal end 88 may be fixed to the spool 14 in any suitable fashion such as fastening, welding, etc.

The spool 14 is designed to coil the cable 16 about the spool 14 when the spool 14 rotates relative to the housing 12. For example, as set forth above, the head 52 of the spool 14 may include the channel 54 and, in such an example, the cable 16 is engaged with the channel 54. The channel 54 extends circumferentially about the spool 14, i.e., is circular. Such a configuration provides packaging advantages because the overall length of the assembly 10 is reduced due to the circular window of the cable 16 about the spool 14.

The assembly 10 may include a cable stop for limiting rotation of the spool 14 relative to the housing 12. The amount of allowed rotations of the spool 14 may be tuned to retract the passenger restraint a desired distance. As an example, the assembly 10 may include a first cable stop 56 fixed to the cable 16. The assembly 10 may include a second cable stop 58 fixed to the housing 12. When the pyrotechnic device 20 is activated and the spool 14 rotates relative to the housing 12, the first cable stop 56 travels toward the second cable stop 58 as the cable 16 is wound around the head 52 of the spool 14 until the first cable stop 56 contacts the second cable stop 58. When the first cable stop 56 contacts the second cable stop 58, the first cable stop 56 prevents further winding of the cable 16 about the head 52 of the spool 14. This stops rotation of the spool 14 relative to the housing 12.

The first cable stop 56 may be fixed to the cable 16 in any suitable fashion, e.g., crimping, welding, fastening, etc. The second cable stop 58 is fixed to the housing 12. As shown in the example in the Figures, the bracket 84 may also be the second cable stop 58 or the second cable stop 58 may be fixed to the bracket 84. In any event, the second cable stop 58 has a hole 90 and the cable 16 extends through the hole. The first cable stop 56 is larger than the hole 90 such that the first cable stop 56 is stopped when the first cable stop 56 reaches the hole 90.

As set forth above, the pyrotechnic device 20 is fixed to the housing 12, i.e., directly or indirectly fixed to the housing 12. The pyrotechnic device 20 is designed to rotate the spool 14 relative to the housing 12. Specifically, the pyrotechnic device 20 has an output nozzle 60 in communication with the cavity 42. The pyrotechnic device 20 is activated to release gas into the cavity 42 and rotate the spool 14 relative to the housing 12. Specifically, the gas exerts force on the blades 50 to rotate the spool 14.

The pyrotechnic device 20 may include pyrotechnic material which detonates upon actuation, e.g., upon receipt of a command, such as an electrical pulse. The pyrotechnic material may be disposed in a cylinder of the pyrotechnic device 20.

As set forth above, the ratchet-and-pawl mechanism 22 is between the housing 12 and the spool 14. The ratchet-and-pawl mechanism 22 includes the ratchet 62 and the pawl 64. The ratchet 62 is on one of the housing 12 and the spool 14 and the pawl 64 is on the other of the housing 12 and the spool 14. In the example shown in the Figures, the ratchet 62 is on the cylindrical wall 38 of the housing 12 and the pawl 64 is on the inner cylinder 48 of the spool 14.

The ratchet 62 extends into the cavity 42. The ratchet 62 includes teeth extending from the cylindrical wall 38 of the housing 12 toward the inner cylinder 48 of the spool 14. The teeth are positioned circumferentially about the cylindrical wall 38 of the housing 12 and are circumferentially spaced around the cylindrical wall 38 of the housing 12. The teeth and the housing 12 may be monolithic, i.e., a one-piece unit without any fasteners, joints, welding, adhesives, etc., fixing the housing 12 and the teeth to each other.

The pawl 64 engages the ratchet 62 to allow rotation of the spool 14 relative to the housing 12 in one direction and to prevent relative rotation in the other direction. The pawl 64 is positioned on the inner cylinder 48 of the spool 14 to be aligned with the ratchet 62. Specifically, the ratchet-and-pawl mechanism 22 allows the spool 14 to rotate relative to the housing 12 when rotated by the pyrotechnic device 20 and prevents rotation in the other direction. The pawl 64 may be spring loaded to be biased toward the teeth of the ratchet 62. The teeth are designed to allow the pawl 64 to ride over the teeth against the bias of the spring in one direction and to engage the teeth under the bias of the spring in the other direction.

The assembly 10 includes covers 70 sandwiching the spool 14 and the housing 12 therebetween. The covers 70 may be separate from the spool 14 and/or the housing 12, as shown in the Figures. As another example, the spool 14 and/or the housing 12 may be monolithic with the respective cover 70, i.e., a one-piece unit without any fasteners, joints, welding, adhesives, etc., fixing the housing 12 and the teeth to each other. The covers 70 enclose the cavity 42. In the example shown in the Figures, the cover 70 is sealed to the first end 40 of the housing 12, i.e., to substantially prevent gas from the pyrotechnic device 20 from escaping therebetween.

The assembly 10 includes a sleeve 80. The sleeve 80 may be attached to one of the covers 70 as shown in the Figures. The sleeve 80 my surround the fastener and extend along the length of the fastener through the bore of the inner cylinder 48 i.e., is centered on the axis 78. The cover 70 and the sleeve 80 may be monolithic, i.e., a one-piece unit without any fasteners, joints, welding, adhesives, etc., fixing the sleeve 80 and the cover 70 to each other.

The assembly 10 may include seals 66, 82 that allow rotation of the spool 14 and substantially prevent gas from the pyrotechnic device 20 from escaping the cavity 42. For example, one seal 66 is between the head 52 of the spool 14 and the second end 46 of the cylindrical wall 38 of the housing 12. As another example, one seal 82 is between the head 52 of the spool 14 and the cover 70. The seals 66, 82 may be of any suitable material, e.g., a polymer such as an elastomer.

The assembly 10 may include a plug 68 fixed to the cylindrical wall 38 of the housing 12. The plug 68 is sized and shaped to plug all or part of the cavity 42 between the cylindrical wall 38 and the inner cylinder 48 to limit or prevent gas from the pyrotechnic device 20 to back flow against the desired rotational direction of the spool 14 relative to the housing 12. In addition to or in the alternative to the plug 68, a lip seal 86 may be in the cavity 42. As an example, the lip seal 86 may be fixed in between the plug 68 and extend to the inner cylinder 48. In such an example, the lip seal 86 seals against the inner cylinder 48. The lip seal 86 prevents gas from the pyrotechnic device 20 traveling against the desired rotational direction of the spool 14 relative to the housing 12 and is resiliently flexible relative to the blades 50 such that the blades 50 may travel along the cavity 42 as the spool 14 rotates. Specifically, during rotation of the spool 14, the blades 50 impact the lip seal 86 and move the lip seal 86 sufficiently to allow the blades 50 to continue moving. When impacted by the blade 50, the blade moves the lip seal 86 and after the blade 50 has moved past the lip seal 86, the lip seal 86 returns to a position engaging the inner cylinder 48. The plug 68 and the lip seal 86 may be of any suitable material, e.g., a polymer such as an elastomer.

The assembly 10 may include a release valve 92 on the cylindrical wall 38 of the housing 12. The release valve 92 is designed to release and allow exhaust of pressure from the cavity 42 in the event pressure in the cavity 42 exceeds a threshold. The release valve 92 is releasably fixed (e.g., welded, adhered, etc.) to a hole through the cylindrical wall 38. The release valve 92 may be of any suitable material, e.g., metal, plastic, elastomer, etc.

The fastener of the assembly 10 retains the spool 14 and the housing 12 assembled together. The fastener may be, for example, a bolt 74 extending through the spool 14 and the housing 12. The fastener may be a bolt 74 and a nut 76 threadedly engaged with the bolt 74, as shown in the Figures.

In operation, upon detection of a vehicle 24 impact, the pyrotechnic device 20 detonates and drives the blades 50 to rotate the spool 14 relative to the housing 12. As the spool 14 rotates relative to the housing 12 the cable 16 is wound around the channel 54 of the spool 14 to retract the passenger restraint. As the cable 16 winds around the channel 54, the first cable stop 56 approaches the second cable stop 58 until the first cable stop 56 contacts the second cable stop 58 to prevent further rotation of the spool 14 relative to the housing 12. During rotation of the spool 14 relative to the housing 12, the pawl 64 rides along the ratchet 62. As discussed above, the ratchet-and-pawl mechanism 22 prevents rotation of the spool 14 in the other direction. Thus, when the passenger restraint is retracted by winding of the cable 16 on the spool 14, the ratchet-and-pawl mechanism 22 prevents extension of the passenger restraint.

With reference to FIG. 5, the pyrotechnic device 20 has not been activated. The cable 16 is engaged with the channel 54. The second first stop 56 is spaced from the second cable stop 58. As shown in FIG. 5, the pawl 64 is not engaged with the ratchet 62. In another example, the pawl 64 may be engaged with the ratchet 62 before activation of the pyrotechnic device 20.

Figure 6:
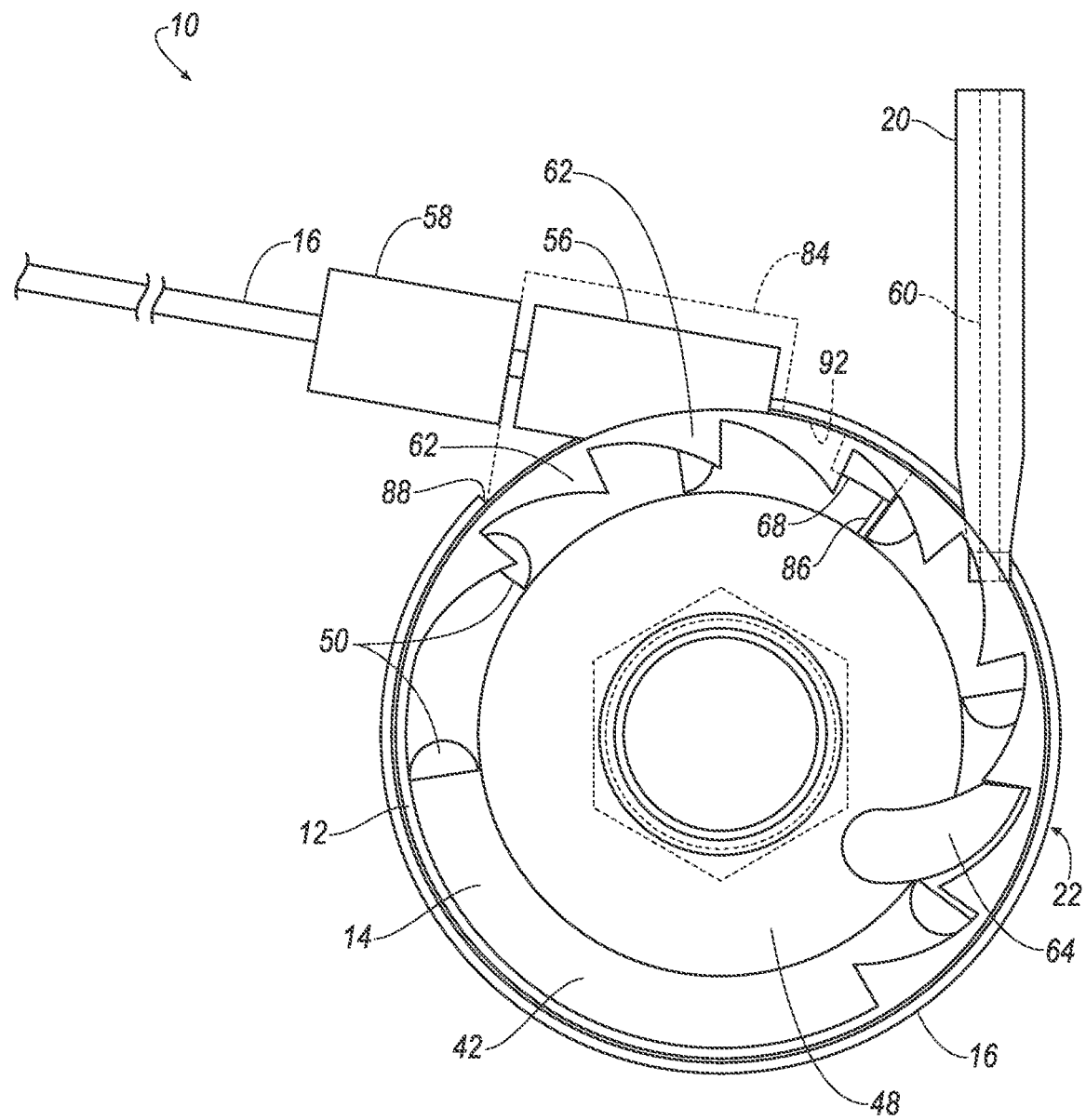
FIG. 6 is a top view of the assembly in a retracted position.

With reference to FIG. 6, the pyrotechnic device 20 has been detonated to retract the passenger restraint. The cable 16 is coiled around the spool 14. The first cable stop 56 is engaged with the second cable stop 58. As shown in FIG. 6, the pawl 64 is engaged with the ratchet 62 and the spool 14 is prevented from rotating to prevent extension of the cable 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. An assembly comprising:
a housing;
a spool rotatable relative to the housing;
a cable fixed to the spool;
a passenger restraint fixed to the cable;
a pyrotechnic device fixed to the housing and designed to rotate the spool relative to the housing; and
a ratchet-and-pawl mechanism between the housing and the spool;
the housing and the spool define a cavity therebetween and the pyrotechnic device has an output nozzle in communication with the cavity.

2. The assembly of claim 1, wherein the housing includes a cylindrical wall having an end and the spool is adjacent the end of the cylindrical wall of the housing, the cylindrical wall and the spool defining the cavity.

3. The assembly of claim 2, wherein the spool is concentric with the cylindrical wall of the housing.

4. The assembly of claim 2, wherein the cylindrical wall of the housing has an axis and the housing and the spool oppose each other along the axis.

5. The assembly of claim 4, wherein the spool is concentric about the axis.

6. The assembly of claim 2, further comprising a seal between the spool and the end of the cylindrical wall of the housing.

7. The assembly of claim 2, wherein a ratchet of the ratchet-and-pawl mechanism is fixed to the cylindrical wall of the housing.

8. The assembly of claim 7, wherein the ratchet extends into the cavity.

9. The assembly of claim 7, wherein a pawl of the ratchet-and-pawl mechanism is fixed to the spool.

10. The assembly of claim 9, wherein the spool includes an inner cylinder in the cavity and concentric with the cylindrical wall of the housing, the pawl being fixed to the inner cylinder of the spool.

11. The assembly of claim 10, further comprising a blade fixed to the inner cylinder and extending from the inner cylinder toward the cylindrical wall of the housing.

12. The assembly of claim 10, further comprising blades fixed to the inner cylinder and spaced circumferentially about the inner cylinder, the blades extending from the inner cylinder toward the cylindrical wall of the housing.

13. The assembly of claim 10, further comprising a first cable stop fixed to the cable and a second cable stop fixed to the housing, the second cable stop having a hole through which the cable slidably extends from the first cable stop to the spool, the hole being smaller than the first cable stop.

14. The assembly of claim 2, wherein the cylindrical wall of the spool includes an outer surface having a channel and the cable is engaged with the channel.

15. The assembly of claim 1, further comprising a first cable stop fixed to the cable and a second cable stop fixed to the housing, the second cable stop having a hole through which the cable slidably extends from the first cable stop to the spool, the hole being smaller than the first cable stop.

16. The assembly of claim 1, wherein the passenger restraint is a seatbelt buckle.

17. An assembly comprising:
a housing;
a spool rotatable relative to the housing;
a cable fixed to the spool;
a passenger restraint fixed to the cable;
a pyrotechnic device fixed to the housing and designed to rotate the spool relative to the housing; and
a ratchet-and-pawl mechanism between the housing and the spool;
a first cable stop fixed to the cable and a second cable stop fixed to the housing, the second cable stop having a hole through which the cable slidably extends from the first cable stop to the spool, the hole being smaller than the first cable stop.

18. The assembly of claim 17, wherein:
the housing and the spool define a cavity therebetween and the pyrotechnic device has an output nozzle in communication with the cavity; and
the housing includes a cylindrical wall having an end and the spool is adjacent the end of the cylindrical wall of the housing, the cylindrical wall and the spool defining the cavity.

19. The assembly of claim 17, wherein the passenger restraint is a seatbelt buckle.

* * * * *